March 25, 1941.  H. C. SHOCK  2,236,011

APPARATUS FOR CRACKING AND HANDLING GLASS SHEETS

Filed Jan. 18, 1939  6 Sheets-Sheet 1

Inventor
HARRY C. SHOCK.

By Frank Fraser
Attorney

March 25, 1941.  H. C. SHOCK  2,236,011
APPARATUS FOR CRACKING AND HANDLING GLASS SHEETS
Filed Jan. 18, 1939  6 Sheets-Sheet 3

Inventor
HARRY C. SHOCK.
Frank Fraser
Attorney

March 25, 1941.  H. C. SHOCK  2,236,011

APPARATUS FOR CRACKING AND HANDLING GLASS SHEETS

Filed Jan. 18, 1939  6 Sheets-Sheet 4

Inventor
HARRY C. SHOCK.

By Frank Fraser
Attorney

March 25, 1941.  H. C. SHOCK  2,236,011

APPARATUS FOR CRACKING AND HANDLING GLASS SHEETS

Filed Jan. 18, 1939  6 Sheets-Sheet 5

Inventor
HARRY C. SHOCK.

By Frank Fraser
Attorney

March 25, 1941. H. C. SHOCK 2,236,011
APPARATUS FOR CRACKING AND HANDLING GLASS SHEETS
Filed Jan. 18, 1939 6 Sheets-Sheet 6

Inventor
HARRY C. SHOCK.
By Frank Fraser
Attorney

Patented Mar. 25, 1941

2,236,011

UNITED STATES PATENT OFFICE 2,236,011

APPARATUS FOR CRACKING AND HANDLING GLASS SHEETS

Harry C. Shock, Charleston, Ohio, assignor to Libbey-Owens-Ford Glass Company, Toledo, Ohio, a corporation of Ohio Application January 18, 1939, Serial No. 251,581

4 Claims. (Cl. 49—43)

The present invention relates to apparatus for cracking and handling glass sheets which have been scored.

An important object of the invention is the provision of improved apparatus for effecting the cracking of the glass sheets as they are being carried forwardly in a substantially continuous manner.

Another important object of the invention is the provision of improved apparatus which will crack the glass sheets into a plurality of strips or sections with certainty and accuracy and wherein loss through breakage will be reduced to a minimum.

Another important object of the invention is the provision of improved apparatus which will operate to separate the edges of the strips or sections of the sheet as soon as the cracking off occurs, whereby to avoid chipping of such edges.

A further important object of the invention is the provision of improved apparatus which will also operate to crack off relatively very narrow strips of glass, such as are ordinarily present at the front and rear ends of a scored sheet as the said sheet is carried forwardly.

Other objects and advantages of the invention will become more apparent during the course of the following description, when taken in connection with the accompanying drawings.

In the drawings, wherein like numerals are employed to designate like parts throughout the same:

Fig. 8 is a detail sectional view showing the friction brake used on certain of the conveyor rolls;

Figure 1:
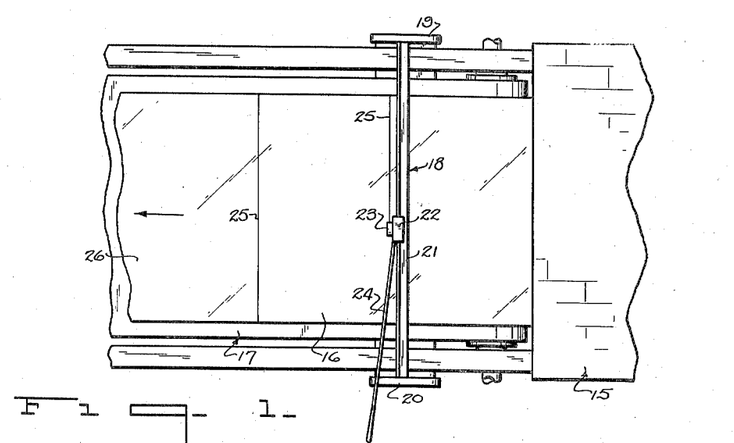
Fig. 1 is a plan view of apparatus for scoring a continuous sheet or ribbon of glass transversely as it issues from an annealing leer.

Referring now to the drawings, and particularly to Fig. 1, the numeral 15 designates the outlet end of a horizontal annealing leer of any conventional or preferred construction and 16 a continuous sheet or ribbon of glass emerging therefrom. Positioned closely adjacent the outlet end of the leer, to receive the glass ribbon therefrom and carry it forwardly, is an endless cutting or capping table 17 which travels in the same direction and preferably at the same speed as the continuous ribbon 16.

As the continuous ribbon 16 emerges from leer 15 upon capping table 17, it is adapted to be cut transversely into individual sheets of the desired length and for this purpose there may be provided the cross cutting mechanism designated in its entirety by the numeral 18. This cutting mechanism may be of any conventional or approved construction. For instance, it may be of the general type disclosed in the patent to John L. Drake, No. 2,033,188, granted March 10, 1936, and is adapted for movement with the glass during the transverse scoring thereof, whereby to permit accurate cuts to the end that the ribbon of glass can be cut transversely either to size or substantially to size.

The cross cutting mechanism 18 herein disclosed embodies generally a pair of carriages 19 and 20 arranged at opposite sides of the endless table 17 and movable longitudinally thereof upon suitable tracks (not shown). Extending transversely across the table 17 and connecting the carriages 19 and 20 is a cutter guide member 21 upon which is slidably mounted a cutter carriage 22 carrying the cutter 23. The cutter carriage and cutter are movable along the cutter guide by an operating rod 24. Upon drawing of the cutter 23 across and in contact with the continuous ribbon 16, it is adapted to effect the scoring thereof as indicated at 25. The glass is then broken along the score line 25 in a well known manner to provide individual sheets, one of which is indicated at 26. Any suitable means may be employed for causing the cutting mechanism 18 to move with the glass during the scoring of the latter and to return to starting position after the scoring has been completed.

After the glass sheet 26 leaves the capping table 17, it is delivered to an endless conveyor or reciprocating table 27 (Fig. 2) which carries it forwardly beneath the strip cutting mechanism 28 by means of which the sheet is cut into a plurality of strips of the desired width. The strip cutting mechanism 28 may consist of a supporting member 29 extending transversely above the conveyor or table 27 and supported at its opposite ends by standards 30 and 31. Carried by the supporting member 29 are a plurality of cutter arms 32, each being provided with a cutting element 33. The cutter arms 32 may be pivotally or otherwise mounted upon the supporting member 29 so that they are operable to move the cutting elements 33 into and out of cutting position.

Figure 2:
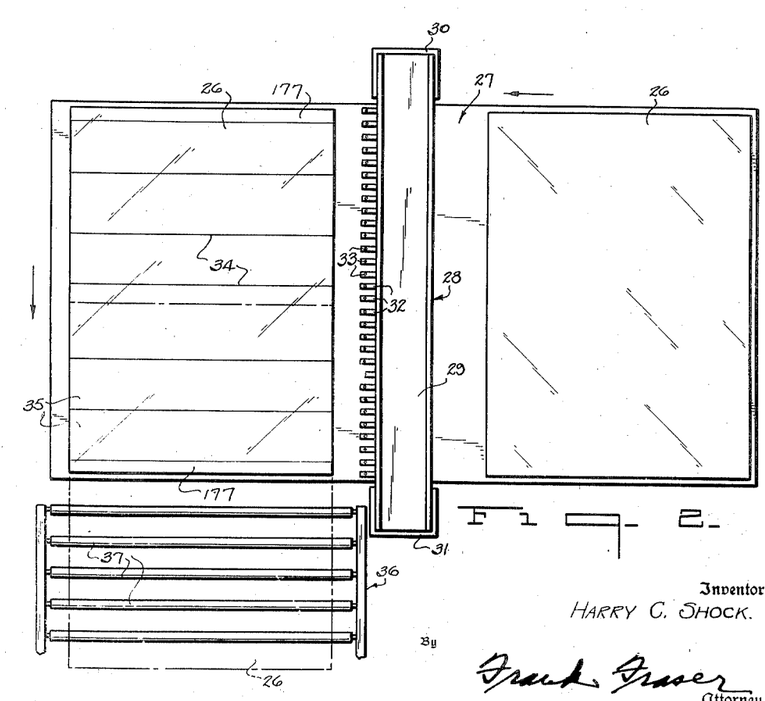
Fig. 2 is a plan view of apparatus for receiving the cut sheets from the apparatus of Fig. 1 and scoring them to form a plurality of strips or sections.

As the glass sheet 26 passes beneath the cutting mechanism 28, it is adapted to be scored along one or a plurality of lines as indicated at 34 to separate the sheet into a plurality of strips 35 of the desired width, such as 8", 10", 12", etc. After the glass sheet has been passed beneath the cutting mechanism 28 it is adapted to be moved manually at substantially right angles in the direction indicated by the arrow onto a horizontal roll conveyor 36 composed of a series of rolls 37. This roll conveyor leads to the cracking off apparatus shown in Fig. 3 and designated in its entirety by the numeral 38. The glass sheet is then carried through the cracking off apparatus which applies the pressure necessary to crack the sheet along the score lines 34 into a plurality of strips which are then delivered onto an endless conveyor or the like 39 from which they may be removed and cut into lights of the desired sizes.

Figure 3:
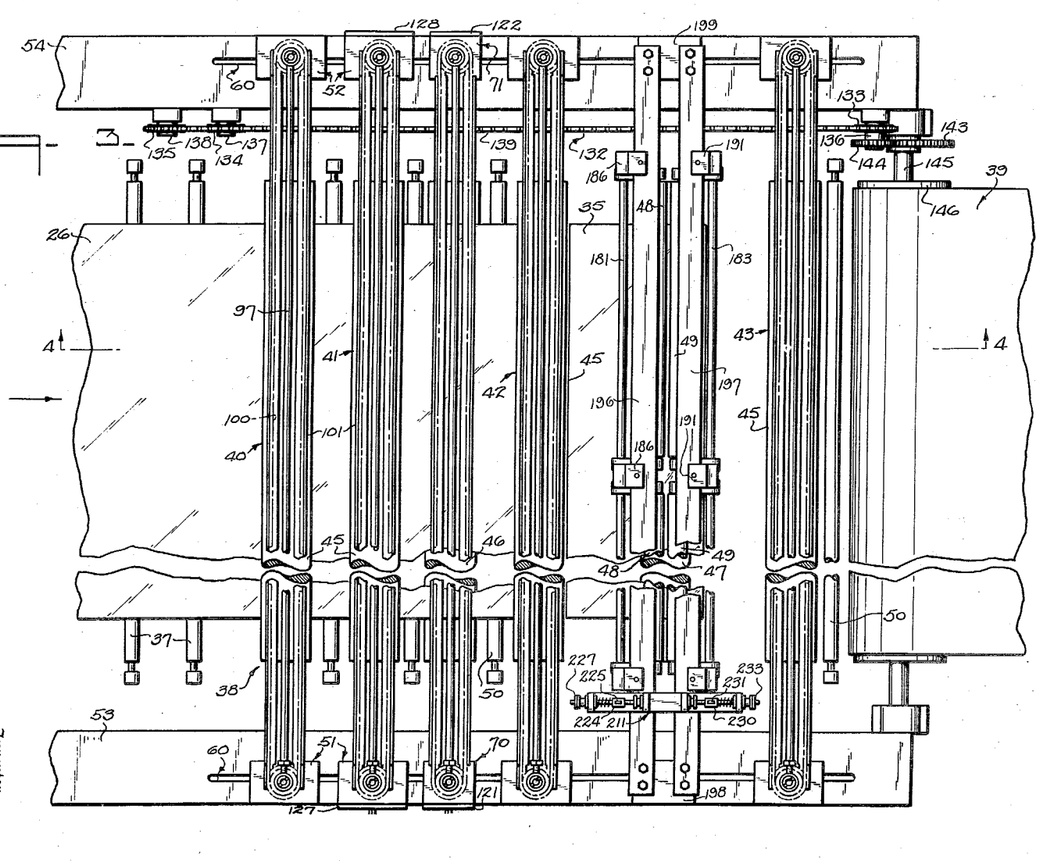
Fig. 3 is a plan view of the apparatus for cracking the glass sheets along the score lines.
Figure 4:
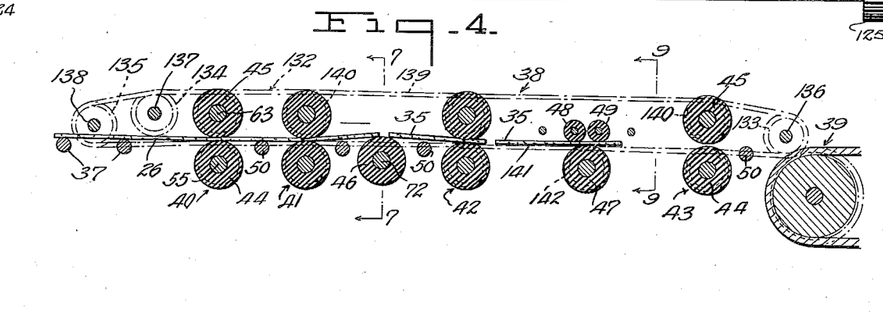
Fig. 4 is a vertical longitudinal section through the cracking off apparatus taken substantially on line 4—4 of Fig. 3.

As shown in Figs. 3 and 4, the cracking off apparatus 38 comprises generally a plurality of horizontally aligned pairs of conveyor rolls 40, 41, 42, and 43, each comprising a lower roll 44 and an upper roll 45. Mounted between the pairs of conveyor rolls 41 and 42 is the breaker roll 46, while arranged between the pairs of conveyor rolls 42 and 43 is a conveyor roll 47 above which are mounted the two relatively small cracking off rollers 48 and 49.

The lower rolls 44 of the several pairs of conveyor rolls 40, 41, 42, and 43 together with conveyor roll 47 are preferably arranged in horizontal alignment with one another, while the breaker roll 46 is disposed slightly above the level of said conveyor rolls to effect the cracking of the glass sheet 26 along the score lines 34 as the said sheet passes between said conveyor rolls and over said breaker roll. The small cracking-off rollers 48 and 49 cooperate with conveyor roll 47 to crack off the relatively very narrow strips of glass, such as are ordinarily present at the front and rear ends of the sheet and, in some instances, also intermediate the ends thereof. Interposed between the several pairs of conveyor rolls and breaker roll are the relatively small conveyor rolls 50 similar to and in horizontal alignment with the conveyor rolls 37 leading to the cracking off apparatus.

Figures 5, 6:
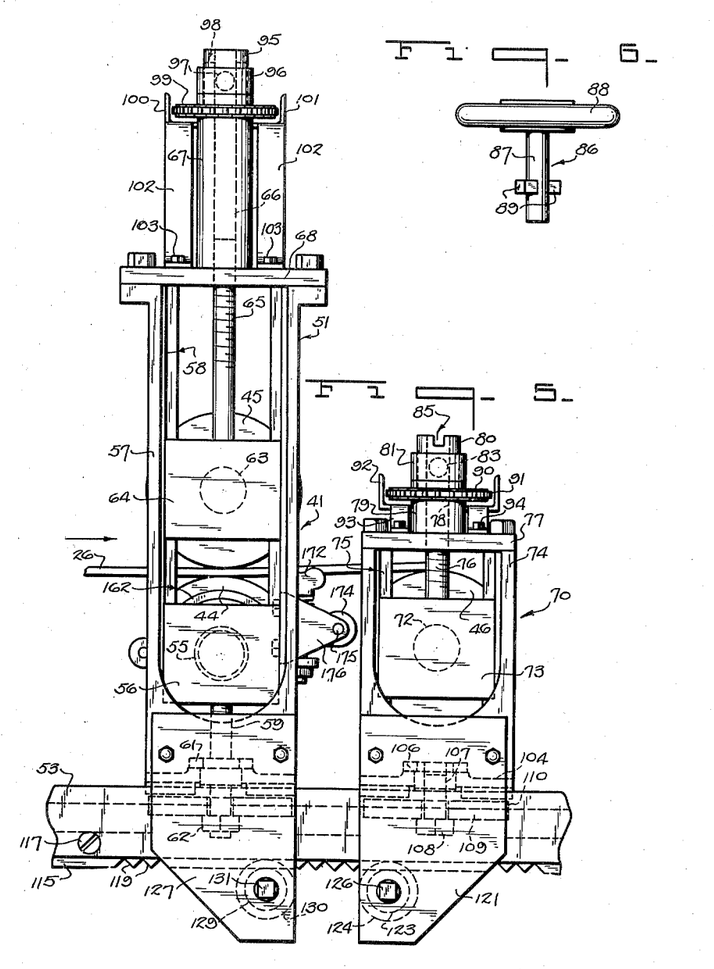
Fig. 5 is a side elevation of a portion of the cracking off apparatus showing one pair of conveyor rolls and the breaker roll.
Fig. 6 is a view of the tool used for adjusting the conveyor and breaker rolls vertically.

The several pairs of conveyor rolls 40, 41, 42, and 43 are preferably mounted and operated in substantially the same manner. As best illustrated in Figs. 3 and 5, each pair of conveyor rolls is carried at its opposite ends by the supporting means designated generally at 51 and 52 and mounted upon the longitudinally extending stationary supporting beams 53 and 54 respectively. The lower conveyor roll 44 is carried upon a shaft 55 journaled at each end in a rectangular bearing block 56. The bearing block 56 is mounted for vertical adjustment within a substantially U-shaped supporting frame 57 provided at the opposite sides thereof with vertical guideways 58 between which said bearing block is slidably arranged. The bearing block 56 is supported in properly adjusted position within the frame 57 by a vertical bolt 59 which passes downwardly through the bottom of the frame 57 and also through a longitudinally extending slot 60 in the respective supporting beam 53 or 54. The supporting bolt 59 is secured against movement longitudinally of the slot 60 by nuts 61 and 62. Upon proper adjustment of the nuts 61 and 62, the bolts 59 at opposite sides of the machine can be threaded upwardly or downwardly to move the bearing blocks 56 vertically and thus raise or lower the roll 44.

The upper roll 45 of each pair of conveyor rolls is carried by a shaft 63 journaled at its opposite ends in bearing blocks 64 also mounted for vertical sliding movement in the guideways 58 of supporting frames 57. The roll 45 is hung at each end from a vertical screw 65 secured at its lower end to the respective bearing block 64 and threaded at its upper end within an opening 66 in a vertical sleeve 67. This sleeve is carried upon the top 68 of the supporting frame 57.

Figure 7:
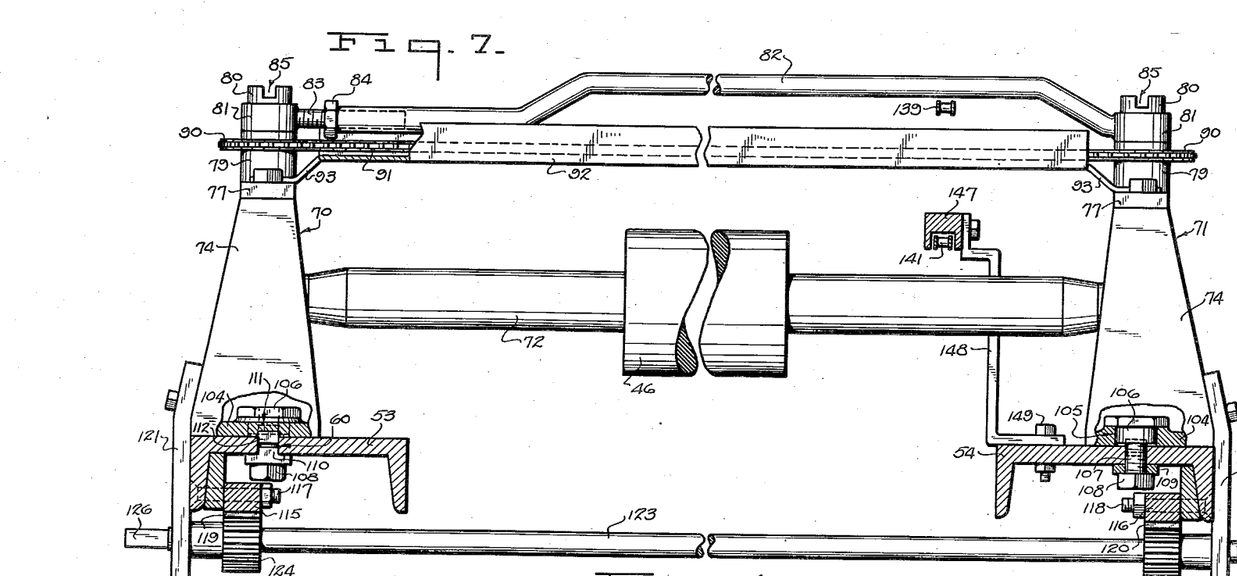
Fig. 7 is a transverse vertical section taken substantially on line 7—7 of Fig. 4 showing the breaker roll.

As best shown in Figs. 3, 5 and 7, the breaker roll 46 is carried at its opposite ends by the supporting means designated generally by the numerals 70 and 71 and comprising substantially U-shaped supporting frames 74 mounted upon the horizontal supporting beams 53 and 54. The breaker roll is carried by a shaft 72 journaled at its opposite ends in rectangular bearing blocks 73 mounted within the supporting frames 74. Each frame 74 is provided at its opposite sides with vertical guideways 75 in which the respective bearing block 73 is slidable. The bearing block 73 at each end of the roll is hung from a vertical screw 76 threaded at its upper end within an opening 78 in a vertical sleeve 79 secured upon the top 77 of the supporting frame.

The sleeve 79 is reduced in diameter at its upper end as indicated at 80 and has loosely received thereon a collar 81. The two collars 81 at opposite ends of the roll are connected together by a tie-rod 82 (Fig. 7), said rod being connected at one of its ends to one of the collars and having threaded within its opposite end a screw 83 carried by the other collar. Carried upon the screw 83 is a nut 84 to provide a turnbuckle arrangement for maintaining the supporting frames 74 at the opposite ends of the roll in proper vertical relation with respect to one another.

With the construction and arrangement above described, it will be evident that upon rotation of the sleeves 79, the screws 76 will be threaded upwardly or downwardly therein to move the bearing blocks 73 vertically to thereby raise or lower the breaker roll 46. In order to facilitate the manual turning of the sleeves 79, the upper end of each sleeve is formed with a transverse slot 85 and adapted to be associated therewith is a tool 86 illustrated in Fig. 6. This tool comprises a vertical cylindrical shank 87 carrying at its upper end a hand-wheel 88 and provided adjacent its lower end with oppositely directed lugs 89. When it is desired to turn either sleeve 79 to raise or lower the corresponding end of breaker roll 46, the lower end of the shank 87 of tool 86 is inserted downwardly into the upper end of opening 78 in the sleeve until the lugs 89 of said tool are received within the transverse slot 85. Upon turning of the hand-wheel 88, the sleeve 79 can be rotated to raise or lower the corresponding end of the breaker roll. Since the collars 81 are loosely received upon the upper reduced ends 80 of sleeves 79, they in no way interfere with the rotation thereof.

In order to avoid breakage or slipping of the glass, it is desirable that the opposite ends of the breaker roll 46 be simultaneously raised and lowered an equal distance so that the roll will always be maintained in a horizontal position. The invention therefore contemplates means for connecting the sleeves 79 at the opposite ends of the roll to cause them to rotate in unison upon turning of either sleeve by the operator. To this end, there is keyed to each sleeve 79 a sprocket 90 and trained about said sprockets is a sprocket chain 91. Upon turning of the sleeve 79 at either end of the roll, the sleeve at the opposite end of said roll will be simultaneously rotated an equal amount and in the same direction through the sprocket and chain connection. In order to prevent sagging of the sprocket chain 91, there is provided a horizontal channel-shaped guide member 92 provided at its opposite ends with bracket portions 93 secured to the top of the supporting frames 74 by screws or the like 94.

The sleeves 67 carrying the upper conveyor rolls 45 are also reduced in diameter at their upper ends as at 95, and have loosely received thereupon collars 96; the collars at the opposite ends of each conveyor roll being connected together by a tie-rod 97 similar to tie-rod 82. Each of the sleeves 67 is also provided in its upper end with a transverse slot 98 similar to slots 85 in sleeves 79 for breaker roll 46. The sleeves 67 can therefore also be rotated by means of the tool 86 to raise and lower the upper conveyor rolls 45 in the same manner as breaker roll 46. Likewise, each of the sleeves 67 carries a sprocket 99 about which is trained a sprocket chain 100, so that the opposite ends of each conveyor roll 45 can be raised and lowered simultaneously an equal distance. The sprocket chain 100 is prevented from sagging by the provision of a substantially U-shaped guide member 101 provided at its opposite ends with bracket portions 102 secured to the tops 68 of supporting frames 57 by screws or the like 103.

The supporting frames 74 provided at the opposite ends of breaker roll 46 are mounted for horizontal adjustment longitudinally of the supporting beams 53 and 54. As shown in Figs. 5 and 7, the bottom 104 of each supporting frame 74 is provided with an opening 105 within which is received the lower cylindrical portion of a nut 106. Passing upwardly through the slot 60 in the respective supporting beam 53 or 54 is a screw 107 threaded in the nut 106. Interposed between the head 108 of screw 107 and the bottom of the supporting beam is a metal strip 109. As illustrated at the left in Fig. 7, the strip 109 is provided at each side of the screw with a rib 110 which fits up into the slot 60 in the supporting beam. The bottom 104 of the supporting frame is also provided at each side of the opening 105 with a groove 111 within which is received a key 112. This arrangement effectively prevents turning or twisting of the supporting frames 74 upon the beams 53 and 54. The same type of mounting is preferably employed for securing the supporting frames 57 of the conveyor rolls to the supporting beams 53 and 54, with the exception that the screws 59 thereof (corresponding to screws 107) continue upwardly through the nut 61 and support the bearing blocks 56 as clearly shown in Fig. 5.

The breaker roll 46 and pair of conveyor rolls 41 in advance thereof are also mounted for horizontal adjustment with respect to one another. To this end, there are carried by the horizontal supporting beams 53 and 54 the longitudinally extending rack bars 115 and 116, said rack bars being secured beneath the supporting beams by bolts or the like 117 and 118 and having teeth 119 and 120 respectively upon the bottom faces thereof.

The supporting frames 74 at the opposite ends of the breaker roll 46 have secured thereto the depending plates 121 and 122 respectively and extending longitudinally of said roll is a connecting rod 123 having its opposite ends rotatably supported in said plates. The rod 123 has keyed thereto spur gears 124 and 125 which mesh with the teeth 119—120 of rack bars 115—116 respectively. The rod 123 projects at one end beyond the respective plate 121 or 122 and is formed with a rectangular portion 126 for the reception or a wrench or other tool to facilitate rotation of the said rod.

Upon turning of the rod 123, the gears 124 and 125 engaging rack bars 115 and 116 will cause the opposite ends of the breaker roll to be moved simultaneously either toward or away from the adjacent pairs of conveyor rolls 41 and 42. The pair of conveyor rolls 41 in advance of breaker roll 46 are adjustably mounted for horizontal movement in the same manner. The supporting frames 57 at opposite sides of the apparatus are provided with depending plates 127 and 128 (Fig. 3) and extending therebetween and carried thereby is a rod 129 provided adjacent each end with a spur gear 130 (Fig. 5) meshing with the teeth of the respective rack bar 115 or 116. One end of the rod 129 is also provided with a rectangular head 131 to facilitate the turning of the rod and the horizontal adjustment of the pair of conveyor rolls 41.

Figure 9:
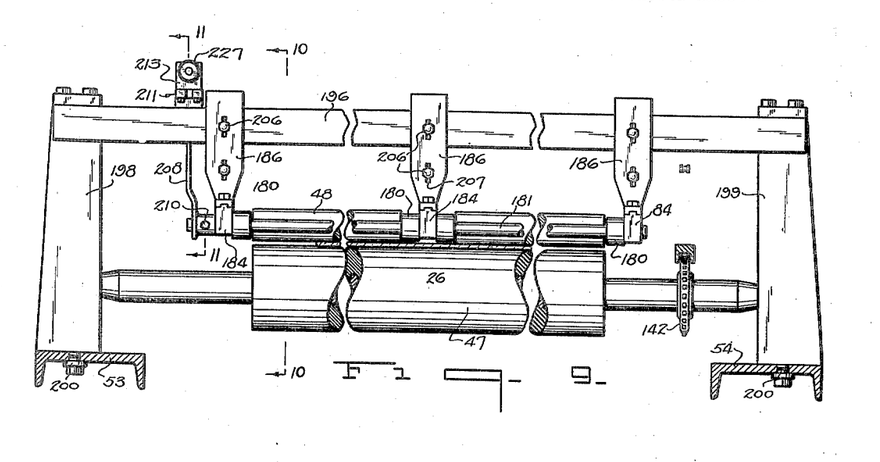
Fig. 9 is a transverse vertical section taken substantially on line 9—9 of Fig. 4 showing the apparatus for cracking off relatively very narrow strips of glass.

The upper and lower rolls 44 and 45 of each pair of conveyor rolls 40, 41, 42, and 43, as well as conveyor roll 47, may be positively driven by means of an endless sprocket chain 132 (Figs. 3 and 4). This chain is trained at one end of its loop about a sprocket 133 and at the opposite end of its loop about sprocket 134 and 135. The sprockets 133, 134, and 135 are mounted upon horizontal stub shafts 136, 137, and 138 respectively suitably carried by the supporting beam 54. The upper flight 139 of sprocket chain 132 engages a sprocket 140 keyed to the shaft 63 of each of the upper conveyor rolls 45, while the lower flight 141 of the sprocket chain engages a sprocket 42 fixed to the shaft 55 of each of the lower conveyor rolls 44 and conveyor roll 47 (Fig. 9). The sprocket chain 132 is disclosed as being driven from the endless conveyor 39 through the intermeshing gears 143 and 144, although any other other desired type of drive may be used. The gear 143 is keyed to the shaft 145 of the drum 146 about which the endless conveyor 39 is trained, while the gear 144 is keyed to the shaft 136 which also carries sprocket 133. In order to maintain the lower flight 141 of sprocket chain 132 in proper engagement with the sprockets 142 of conveyor rolls 44 and 47, there is provided a longitudinally extending inverted channel member 147 carried by brackets 148 secured to the supporting beam 54 by bolts or the like 149. If preferred, the upper conveyor rolls 45 need not be positively driven but can be permitted to freely rotate. This can be done by simply mounting the sprockets 140 loose on the shafts 63 of the upper conveyor rolls.

In operation, the pairs of conveyor rolls 42 and 43 and also conveyor roll 47, following breaker roll 46, are preferably driven at a relatively higher peripheral speed than the pairs of conveyor rolls 40 and 41, in advance of the breaker roll, so that the section or strip of glass, which is snapped or cracked off by the breaker roll, will be moved forward slightly as soon as the cracking off occurs. This separation of the edges of the sheet sections is advantageous as it prevents such edges from rubbing together and chipping on the further forward movement of the glass. This can be accomplished by making the drive sprockets for the conveyor rolls 42, 43, and 47 relatively smaller than the sprockets for the conveyor rolls 40 and 41.

Figure 12:
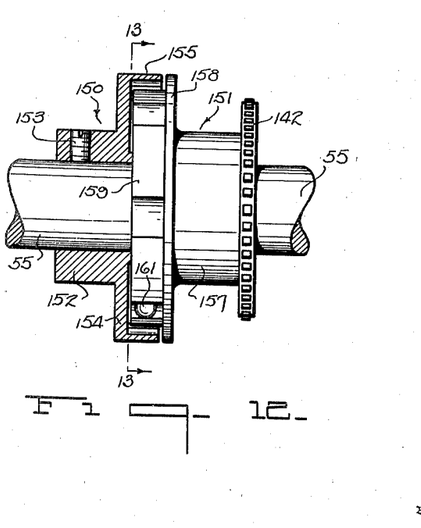
Fig. 12 is an elevation, partially in section, of the overrunning clutch used on certain of the conveyor rolls.
Figure 13:
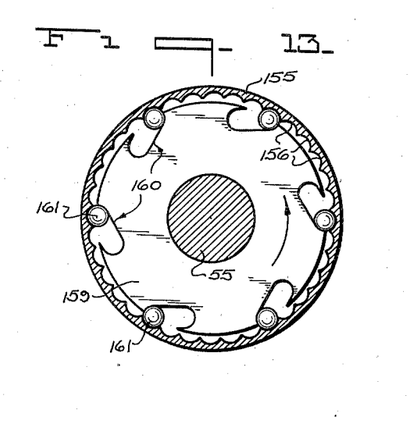
Fig. 13 is a section through the overrunning clutch taken substantially on line 13—13 of Fig. 12.

To avoid slippage between the glass sheets and the conveyor rolls 40 and 41 upon engagement of the sheet with the relatively faster moving pair of conveyor rolls 42 and before the sheet has been cracked, there are associated with the pairs of conveyor rolls 40 and 41 overrunning clutches as illustrated in Figs. 12 and 13. These overrunning clutches permit the conveyor rolls 40 and 41 to be rotated by the sheet at a relatively greater peripheral speed than that at which they are normally positively driven.

Each overrunning clutch includes a driven section 150 and a drive section 151. The driven section 150 comprises a sleeve 152 mounted upon the shaft 55 and fixed thereto by a set screw or the like 153. Carried by the sleeve 152 is an outwardly extending flange 154 formed at its periphery with a rim 155 arranged circumferentially of the shaft 55. The rim 155 is provided upon its inner surface with a series of transverse grooves 156.

The drive section 151 of the overrunning clutch comprises a collar 157 loosely mounted upon the shaft 55 and carrying the sprocket 142. Integral with the collar 157 is a flange 158 carrying a relatively thick plate 159 which is received within the rim 155 of the driven section 150. Provided upon the periphery of the plate 159 are a plurality of recesses 160 within which are arranged metal balls 161.

In operation, the conveyor rolls 44 provided with the overrunning clutches are adapted to be normally positively driven upon rotation of the sprockets 142. More specifically, when the sprocket 142 is driven to rotate the plate 159 in the direction indicated by the arrow in Fig. 13, the balls 161 will move outwardly of the recesses 160 and into the grooves 156 in rim 155 to rotate the driven section 150 and shaft 55. However, when the roll is driven faster than the drive of the sprocket 142, the driven section 150 will rotate faster than plate 159, whereupon the balls 161 will move inwardly into the lower enlarged ends of the recesses 160 so that the roll will be permitted to turn freely, independently of the positive drive and at a relatively faster peripheral speed.

It is also preferred that the lower conveyor roll 44, in advance of breaker roll 46, be provided with a friction brake to retard the sheet after the break occurs at the breaker roll to prevent the edges of the sheet sections from rubbing together. One type of friction brake which may be used is shown in Fig. 8 and designated in its entirety by the numeral 162. The shaft 55 of the roll has keyed thereto a brake drum 163 and encircling said drum are two semi-circular brake shoes 164 and 165 hinged together at one end as at 166. Also encircling the brake drum 163 within brake shoes 164 and 165 is the brake lining 167. The outer ends of the brake shoes 164 and 165 are provided with spaced ears 168 and 169 respectively and passing therethrough is an adjusting bolt 170 having threaded upon one end a nut 171 and provided at its opposite end with a finger portion 172. Encircling the bolt between finger portion 172 and ear 168 is a compression spring 173 which normally urges the brake shoes 164 and 165 toward one another and into engagement with the brake drum 163. Upon rotation of the bolt 170, the pressure exerted by the brake shoes upon the drum may be varied as desired. Passing through the outer end 174 of ear 168 is a pin 175 fixed to a bracket 176 secured to the supporting frame 57. By means of the friction brake 162, the shaft 55 and, consequently, the conveyor roll will be given a more steady movement with less vibration which will result in a more constant uniform advance of the glass sheets to and over the breaker roll 46.

Figures 10, 11:
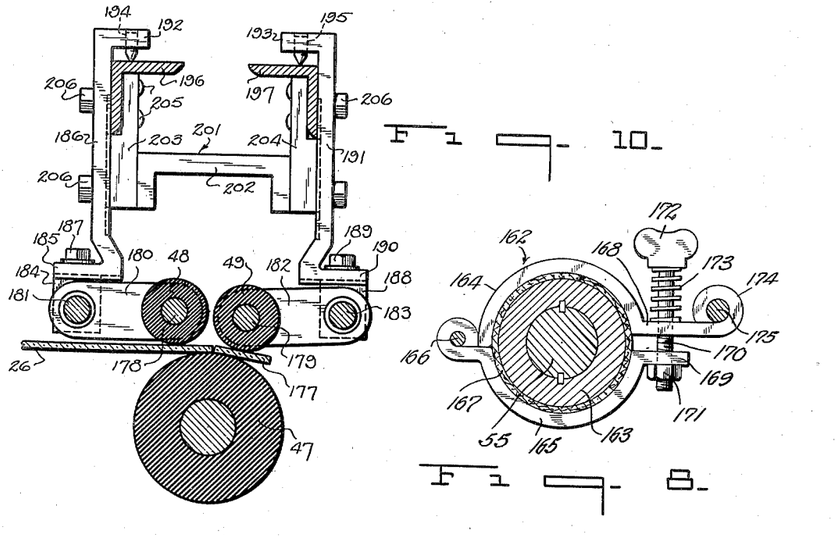
Fig. 10 is a vertical section taken substantially on line 10—10 of Fig. 9.
Fig. 11 is a vertical section taken substantially on line 11—11 of Fig. 9.
Figure 11:
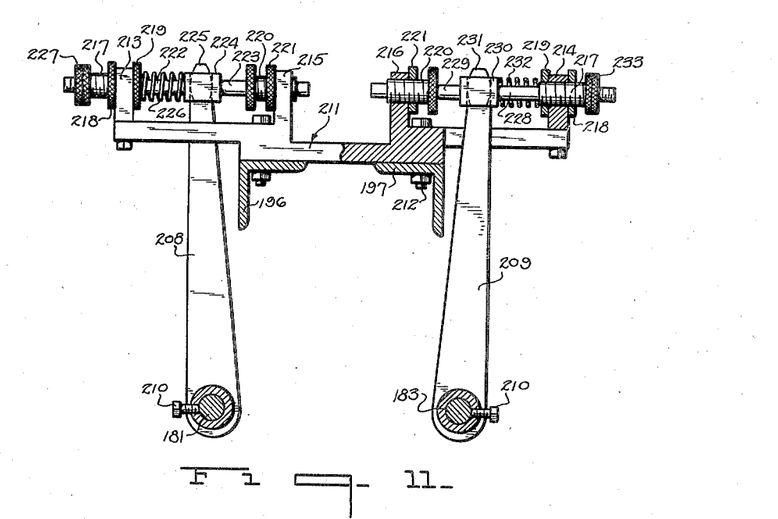

As brought out above, the two relatively small cracking off rollers 48 and 49 cooperate with the conveyor roll 47 to crack off relatively very narrow strips of glass, such as are present at the opposite ends of the glass sheet and which are not snapped off by the breaker roll 46. The cracking off of such a relatively narrow strip 177 is shown in Fig. 10 and the apparatus for accomplishing this purpose is best illustrated in Figs. 3, 9, 10, and 11.

The cracking off rollers 48 and 49 are mounted upon shafts 178 and 179 respectively. The shaft 178 is supported at its opposite ends and also intermediate its ends in substantially horizontal arms 180 pivotally mounted upon a transverse rod 181 while the shaft 179 of roller 49 is mounted at its opposite ends and also intermediate its ends in substantially horizontal arms 182 pivoted upon transverse rod 183. The transverse rod 181 is supported at its opposite ends and also intermediate its ends in blocks 184 secured to the horizontal feet 185 of vertically disposed brackets 186 by screws or the like 187. As shown in Fig. 9, three brackets 186 are provided. The rod 183 is supported at its opposite ends and also intermediate its ends in blocks 188 secured by screws or the like 189 to the feet 190 of vertical brackets 191 similar to and disposed opposite brackets 186. The brackets 186 and 191 are provided at their upper ends with substantially horizontal flanges 192 and 193 through which are threaded screws 194 and 195 engaging the upper horizontal portions of the angle beams 196 and 197. The angle beams 196 and 197 are secured at their opposite ends to vertical standards 198 and 199 mounted upon the horizontal supporting members 53 and 54. The standards 198 and 199 are secured to said supporting members by screws 200 which pass upwardly through the slots 60 in said supporting members and are threaded within the bottoms of said standards.

Arranged between the angle beams 196 and 197 is a substantially U-shaped brace 201 including the horizontal portion 202 and the vertical portions 203 and 204 which are arranged inwardly of the vertical flanges of the angle beams and secured thereto by rivets or the like 205. The brackets 186 and 187 are secured to the respective angle member and vertical bracing strip by screws or the like 206 which pass through slots 207 in said brackets so that the brackets can be raised and lowered as desired. The blocks 184 and 188 are also adjustably carried by the feet 185 and 190 of brackets 186 and 191 so that they can be moved horizontally to bring the cracking off rollers closer together or further apart.

Carried at one end of the rods 181 and 183 are the substantially vertical arms 208 and 209 secured to said rods by set screws or the like 210, associated at their upper ends with a bracket member 211 secured to the angle beams 196 and 197 by bolts or the like 212. The bracket 211 is provided at its opposite ends with vertical bearings 213 and 214 and intermediate its ends with vertical bearings 215 and 216. Threaded through each of the bearings 213 and 214 is a bushing 217 secured in place by nuts 218 and 219, while threaded through each of the bearings 215 and 216 is a bushing 220 secured in place by a nut 221. Passing loosely through the bushings 217 and 220 carried by bearings 213 and 215 are the horizontal rods 222 and 223 secured at their inner adjacent ends to a slotted block 224 through which the upper end 225 of the arm 208 projects. Encircling rod 222 is a compression spring 226 which normally urges the slotted block 224 inwardly and the cracking off roller 48 downwardly. The inward movement of the rod is controlled by a thumb nut 227 threaded upon the outer end of rod 222 and adapted to engage the outer end of bushing 217.

Passing loosely through the bushings 217 and 220 carried by bearings 214 and 216 are the rods 228 and 229 secured at their inner ends to a slotted block 230 through which the upper end 231 of arm 209 projects. Encircling rod 228 is a compression spring 232 acting to normally urge the slotted block 230 inwardly and the cracking off roller 49 downwardly. The inward movement of the slotted block 230 is controlled by a thumb nut 233 threaded upon the outer end of rod 228.

The springs 226 and 232 serve to yieldably urge the cracking off rollers 48 and 49 downwardly to engage the upper surface of the glass sheet and apply sufficient pressure thereto to effect the snapping off of relatively very narrow strips of glass which are not cracked off by the breaker roll 46.

It is to be understood that the form of the invention herewith shown and described is to be taken as the preferred embodiment of the same, and that various changes in the shape, size and arrangement of parts may be resorted to without departing from the spirit of the invention or the scope of the sub-joined claims.

I claim:

1. In combination in an apparatus for cracking glass sheets which have been scored, a plurality of pairs of horizontally spaced conveyor rolls, each comprising a lower roll and an upper roll between which the glass sheets are delivered, a breaker roll arranged between adjacent pairs of conveyor rolls and over which the glass sheets pass, said breaker roll cooperating with said conveyor rolls to crack the glass sheets along the score lines, means for driving the lower conveyor rolls, with the conveyor roll in advance of said breaker roll being driven at a relatively slower peripheral speed than the conveyor roll following said breaker roll, and means associated with the lower conveyor roll in advance of the said breaker roll operable so that the said conveyor roll can be rotated at a relatively faster speed than that at which it is positively driven.

2. In combination in an apparatus for cracking glass sheets which have been scored, a plurality of pairs of horizontally spaced conveyor rolls, each comprising a lower roll and an upper roll between which the glass sheets are delivered, a breaker roll arranged between adjacent pairs of conveyor rolls and over which the glass sheets pass, said breaker roll cooperating with said conveyor rolls to crack the glass sheets along the score lines, means for driving the lower conveyor rolls, with the conveyor roll in advance of said breaker roll being driven at a relatively slower peripheral speed than the conveyor roll following said breaker roll, and an overrunning clutch associated with the lower conveyor roll in advance of the said breaker roll operable so that the said conveyor roll can be rotated by movement of the glass sheets at a speed equal to the speed of rotation of the lower conveyor roll following said breaker roll.

3. In combination in an apparatus for cracking glass sheets which have been scored, a plurality of pairs of horizontally spaced conveyor rolls, each comprising a lower roll and an upper roll between which the glass sheets are delivered, a breaker roll arranged between adjacent pairs of conveyor rolls and over which the glass sheets pass, said breaker roll cooperating with said conveyor rolls to crack the glass sheets along the score lines, means for driving the lower conveyor rolls, with the conveyor roll in advance of said breaker roll being driven at a relatively slower peripheral speed than the conveyor roll following said breaker roll, means associated with the lower conveyor roll in advance of said breaker roll operable so that the said conveyor roll can be rotated at a relatively faster speed than that at which it is positively driven, and friction means for retarding the rotation of the lower conveyor roll in advance of said breaker roll.

4. In combination in an apparatus for cracking glass sheets which have been scored, a plurality of pairs of horizontally spaced conveyor rolls, each comprising a lower roll and an upper roll between which the glass sheets are delivered, a breaker roll arranged between adjacent pairs of conveyor rolls and over which the glass sheets pass, said breaker roll cooperating with said conveyor rolls to crack the glass sheets along the score lines, means for driving the lower conveyor rolls, with the conveyor roll in advance of said breaker roll being driven at a relatively slower peripheral speed than the conveyor roll following said breaker roll, an overrunning clutch associated with the lower conveyor roll in advance of the said breaker roll operable so that the said conveyor roll can be rotated by movement of the glass sheets at a speed equal to the speed of rotation of the lower conveyor roll following said breaker roll, and a friction brake also associated with the lower conveyor roll in advance of said breaker roll acting to retard the rotation of the said conveyor roll.

HARRY C. SHOCK.